US006452766B1

(12) United States Patent
Carper

(10) Patent No.: US 6,452,766 B1
(45) Date of Patent: Sep. 17, 2002

(54) OVER-CURRENT PROTECTION CIRCUIT

(75) Inventor: Scott Douglas Carper, Redwood City, CA (US)

(73) Assignee: National Semiconductor Corporation

( * ) Notice: Subject to any disclaimer, the term of this patent is extended or adjusted under 35 U.S.C. 154(b) by 0 days.

(21) Appl. No.: 09/699,585

(22) Filed: Oct. 30, 2000

(51) Int. Cl.[7] .......... H02H 7/00
(52) U.S. Cl. .......... 361/18; 361/93.9; 323/277
(58) Field of Search .......... 323/274, 277, 323/276, 281, 280; 361/93.9, 180

(56) References Cited

U.S. PATENT DOCUMENTS 4,176,308 A 11/1979 Dobkin et al.
4,536,699 A * 8/1985 Baker .......... 323/276
5,973,569 A 10/1999 Nguyen .......... 330/298
6,208,123 B1 * 3/2001 Sudo .......... 323/280

* cited by examiner

*Primary Examiner*—Shawn Riley
(74) *Attorney, Agent, or Firm*—Merchant & Gould P.C.; John W. Branch

(57) ABSTRACT

An over-current protection circuit for a power regulation circuit includes a reference generator that provides a reference level that is related to the level of the power source output that is controlled by the power regulation circuit in providing a regulated output. During normal operating conditions, the over-current protection circuit is isolated from the control signal provided to the pass element by other circuitry of the power regulation circuit. When the output current exceeds a predetermined level, the over-current protection circuit alters the control signal to the pass element to reduce the output current to a level below the predetermined value. If the over-current condition is removed, the over-current protection circuit detects this condition and again isolates itself from the control signal.

29 Claims, 6 Drawing Sheets

OVER-CURRENT PROTECTION CIRCUIT

FIELD OF THE INVENTION

The present invention relates to power regulation circuits and, more particularly, to over-current protection circuits for power regulations circuits.

BACKGROUND INFORMATION

Power regulation circuits such as, for example, voltage regulators, typically include an over-current protection circuit. Conventional over-current protection circuits typically sense the output current and then disable or shut off the power regulation circuit. In some applications, the pass element is operated in the saturation and the linear or triode regions (in a power saving mode).

One over-current protection approach uses a sense resistor connected in series in the output current path. This approach includes circuitry to detect the current level through the series sense resistor and in response thereto to control the gate voltage of the pass device. This approach does not work well in applications in which the pass element operates in the triode or linear region and in large current applications and is sensitive to temperature.

In another approach, a transistor has its gate and drain connected to the source and gate, respectively, of the pass element. A series sense resistor is connected between the gate and source of the transistor. The current through the sense resistor thereby controls the conductivity of the transistor, which in turn helps control the gate voltage of the pass element when an over current condition exists. This approach also does not work well in large current applications and, in addition, is relatively sensitive to temperature, body effect and the value of the series sense resistor. This approach also does not work well in applications in which the pass element is operated in both the saturation and linear or triode regions.

In still another approach, a current mirror provides current to a smaller transistor that has its gate and source connected to the gate and source of pass device, respectively. The current mirror serves as a current to voltage converter that generates a voltage related to the output current. This voltage controls the gate of another transistor that in turn helps to control the gate voltage of the pass element when an over current condition exists. This approach is relatively sensitive to temperature, the Early effect, and the body effect. In addition, this approach tends to operate improperly when the pass element operates in the linear or triode region.

In view of the shortcomings described above, an over-current protection circuit is needed that works well in relatively large current applications with the pass element being operated in both the saturation and the linear or triode regions, and has reduced sensitivity to temperature, the Early Effect, the body effect, and other process parameters.

SUMMARY

In accordance with aspects of the present invention, an over-current protection circuit for a power regulation circuit is provided. In one aspect of the present invention, the over-current protection circuit includes a reference generator that provides a reference level that is related to the level of the power source output that is controlled by the power regulation circuit in providing a regulated output. During normal operating conditions, the over-current protection circuit is isolated from the control signal provided to the pass element by other circuitry of the power regulation circuit. When the output current exceeds a predetermined level, the over-current protection circuit alters the control signal to the pass element to reduce the output current to a level below the predetermined value. If the over-current condition is removed, the over-current protection circuit detects this condition and again isolates itself from the control signal. The over-current protection circuit does not use a series sense resistor, which allows it to be used in relatively high current applications. In addition, because the reference generator tracks the level of the power source output, the over-current protection circuit can work properly when the pass element is operated in both the saturation, subthreshold and the linear or triode region.

In a further aspect of the present invention, the over-current protection circuit also includes a follower and a detector. The follower senses the level of the power regulation circuit output and, together with the reference generator, provides a clamp signal having a level equal to the level of the power regulation circuit output plus the reference level provided by the reference generator. Thus, the clamp signal depends on levels of both the power regulation circuit output and the power source output. The detector detects when the level of the control signal exceeds the clamp signal. If the level of the control signal does not exceed the level of the clamp signal, the detector does not significantly influence the level of the control signal. However, if the level of the control signal does exceed the level of the clamp signal, the detector operates to change the level of the control signal to reduce the output current.

In another aspect of the present invention, the follower senses the level of the power regulation circuit output and, together with the reference generator, provides a clamp signal having a level equal to the level of the power regulation circuit output plus the reference level provided by the reference generator. In this aspect, the detector detects when the level of the control signal drops below the clamp signal. If the level of the control signal exceeds the level of the clamp signal, the detector does not significantly influence the level of the control signal. However, if the level of the control signal drops below the level of the clamp signal, the detector operates to change the level of the control signal to reduce the output current.

In yet another aspect of the present invention, the reference generator is configurable or programmable to set the clamp signal to a desired level, thereby setting the maximum level of the output current. In one embodiment, the reference generator includes a smaller version of the pass element (i.e., a replica pass element), with a programmable constant current source biasing the replica pass element. The current source can be implemented with current mirror with parallel transistors that can be selectively enabled to control the amount of bias current.

DETAILED DESCRIPTION

Figure 1:
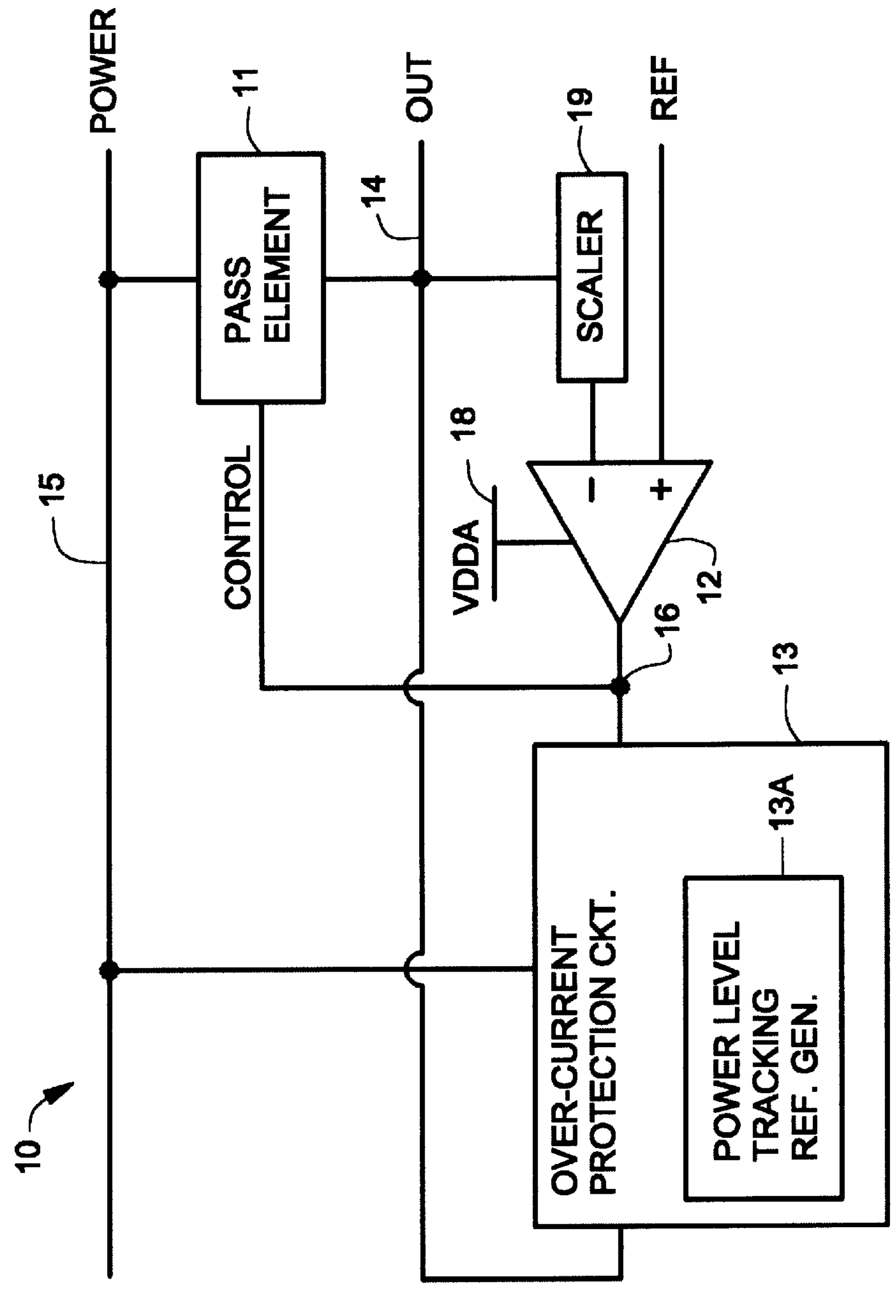
FIG. 1 illustrates a block diagram of a power regulation circuit with an over-current protection circuit in accordance with one embodiment of the present invention.

FIG. 1 illustrates a power regulation circuit 10 according to one embodiment of the present invention. The power regulation circuit 10 can be any type of power regulation circuit such as, for example, a voltage regulator. In this embodiment, the power regulation circuit 10 includes a pass element 11, an amplifier 12 and an over-current protection circuit 13 having a reference generator. The pass element 11 is typically implemented with a transistor (e.g., a power MOSFET) and the amplifier 12 is implemented using a transconductance amplifier.

The pass element 11 is connected to an output terminal 14 and a power line 15. The power line 15 carries the power source output that is regulated by the power regulation circuit 10 to provide the output signal at output terminal 14. The amplifier 12 has its output terminal connected to a control node 16. The control node 16 is connected to the control terminal of the pass element 11. The level (e.g., voltage) at the control node 16 serves as the control signal for the pass element 11.

In addition, the amplifier 12 has its positive terminal connected to receive a reference signal REF. The amplifier 12 is connected to a VDDA line 18 that carries a control power source, which typically has a significantly smaller magnitude than the power source output carried by the power line 15. The amplifier 12 has its negative terminal connected to the output terminal 14 through a scaler 19. In particular, the reference signal REF and the scaler 19 are designed so that when the level of the output signal is at the desired regulated value, the scaled level provided by the scaler 19 is equal to the level of reference signal REF. The amplifier 12 operates in general to continuously adjust the level of the control signal so that the scaled level at its negative terminal is equal to the level of the reference signal REF received at its positive terminal, thereby regulating the output power to a desired level. The above-described circuitry is referred to herein as the core regulator.

In addition to the core regulator, power regulation circuit 10 includes the over-current protection circuit 13. The over-current protection circuit 13 is connected to the output terminal 14 and to the control node 16. Further, in accordance with the present invention, the over-current protection circuit 13 includes a reference generator 13A that is configured to generate a reference signal having a level that corresponds to the level of the power source output at power line 15. As will be described further below, because the reference generator 13A tracks the level of the power source output, the over-current protection circuit 13 can work properly when the pass element 11 is operated in both the saturation region, the subthreshold region and in the linear or triode region. In addition, as can be seen in FIG. 1, the over-current protection circuit 13 does not use a series sense resistor, which allows the over-current protection circuit 13 to be used advantageously in relatively high current low dropout applications.

The power regulator circuit 10 operates as follows. During normal operating conditions, the over-current protection circuit 13 is isolated from the control signal provided to the pass element 11 by the amplifier 12. When the output current exceeds a predetermined level, the over-current protection circuit 13 detects this condition and in response thereto, alters the level of the control signal to cause the pass element 11 to reduce the output current to a level below the predetermined value. If the over-current condition is removed, the over-current protection circuit 13 detects this condition and again isolates itself from the control signal.

Figure 2:
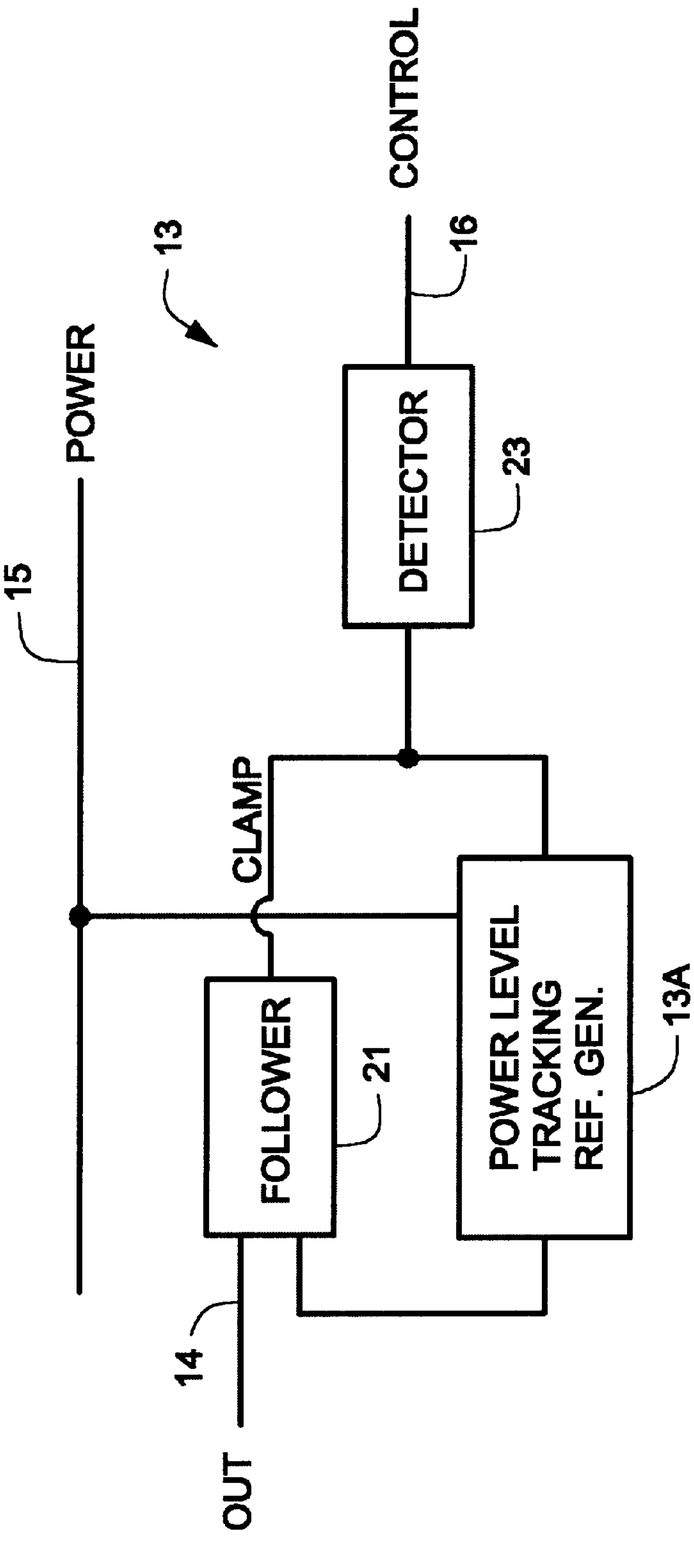
FIG. 2 illustrates a block diagram of an over-current protection circuit, in accordance with one embodiment of the present invention.

FIG. 2 illustrates a block diagram of the over-current protection circuit 13, in accordance with one embodiment of the present invention. In this embodiment, the over-current protection circuit 13 includes a follower 21 and a detector 23, in addition to the reference generator 13A. The follower 21 is connected to sense the output signal at the output terminal 14 and provide a signal to the reference generator 13A having a level that tracks or follows the level of the output signal. The reference generator 13A together with the follower 21 provides a clamp signal having a level equal to the level of the output signal at the terminal 14 plus the level of the clamp signal. Thus, the clamp signal depends on levels of both the output signal at the terminal 14 and the power source output at the power line 15. The detector 23 detects when the level of the control signal exceeds the level of the clamp signal. If the level of the control signal does not exceed the level of the clamp signal, the detector does not significantly influence the level of the control signal. However, if the level of the control signal does exceed the level of the clamp signal, the detector operates to change the level of the control signal to reduce the output current.

Figure 3:
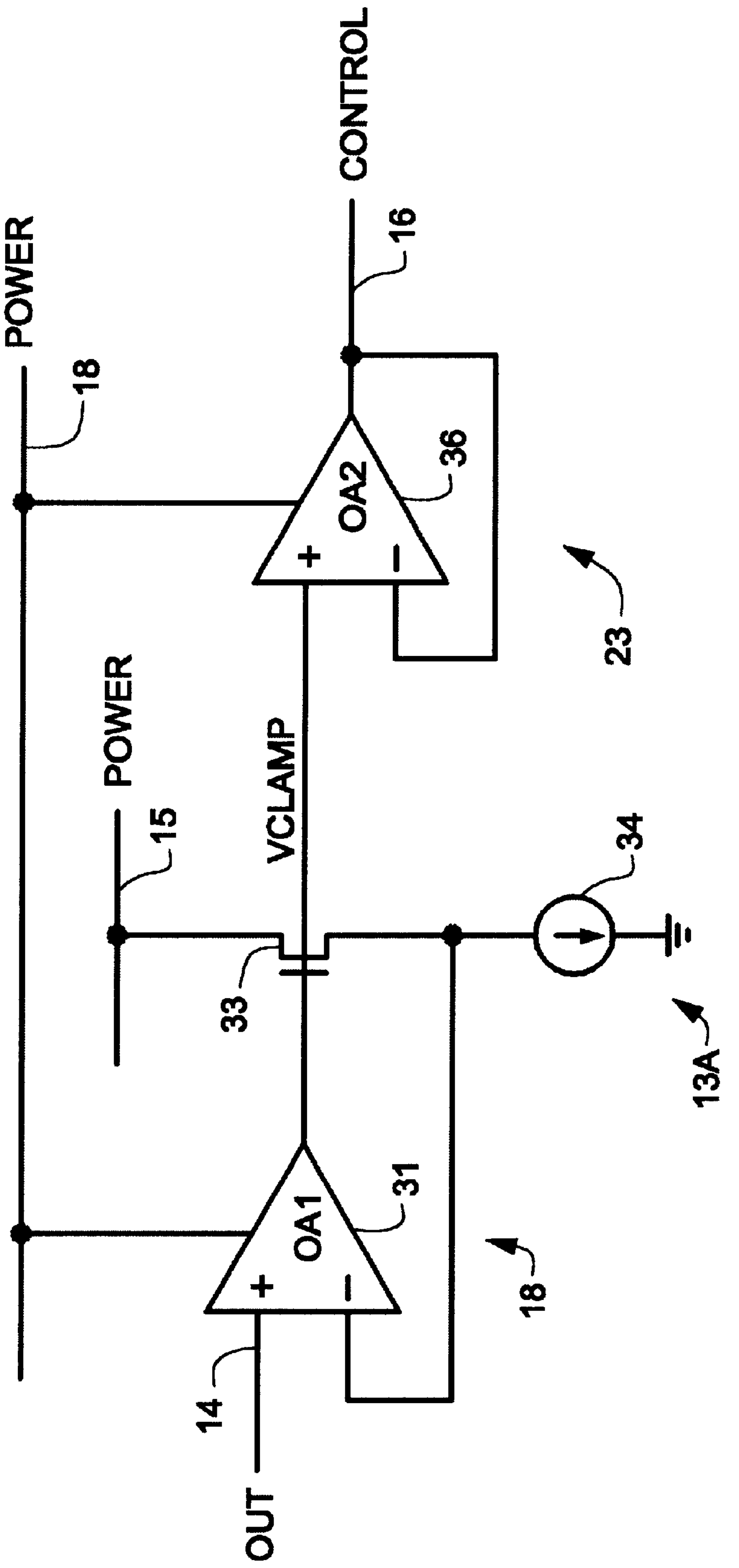
FIG. 3 illustrates a circuit diagram of an over-current protection circuit implementing the over-current protection circuit of FIG. 2, in accordance with one embodiment of the present invention.

FIG. 3 illustrates an implementation of the over-current protection circuit 13 (FIG. 2), in accordance with one embodiment of the present invention. In this embodiment, the follower 21 is implemented with an operation amplifier 31. The reference generator 13A is implemented with a transistor 33 and a constant current source 34. The transistor 33 is of the same conductivity type as the pass element 11 (FIG. 1), which allows over-current protection circuit 13 to compensate for the body effect errors of the pass element 11. The detector 23 is implemented with an operational amplifier 36. In one embodiment, the operational amplifier 36 has an open-drain output stage so that the operational amplifier 36 does not significantly influence the control signal during normal output current conditions.

The elements of this embodiment are interconnected as follows. The operational amplifier 31 has its positive terminal connected to sense the output signal at output terminal 14, and has its negative terminal and its output terminal respectively connected to the source and gate of the transistor 33. The transistor 33 also has its source connected to the current source 34 and has its drain connected to the power line 15. The operational amplifier 36 has its positive terminal connected to the gate of the transistor 33. In addition, the negative and output terminals of operational amplifier 36 are connected to the control node 16.

This embodiment of the over-current protection circuit 13 operates as follows. The operational amplifier 31 senses the level of the voltage at the output terminal 14 and generates the clamp signal (i.e., VCLAMP in this embodiment) to cause the voltage at the source of the transistor 33 to be equal to the output voltage. Thus, the voltage level of the clamp signal is equal to the sum of the output voltage plus the gate-to-source voltage of the transistor 33. The gate-to-source voltage of the transistor 33 can be controlled in part by selecting the current conducted by the current source 34 and the channel size of the transistor 33.

In this embodiment, the operational amplifier 36 operates to compare the voltage level of the control signal to the voltage level of the clamp signal. When the voltage level of the control signal is less than the voltage level of the clamp signal, the operational amplifier 36 (having an open-drain output stage) functions as a comparator. More particularly, the pull down device implementing the open-drain output stage is turned off so that it does not load or influence the control signal at the control node 16. However, when the voltage level of the control signal is greater than the voltage level of the clamp signal plus the input offset of the operational amplifier 36, the operational amplifier 36 then functions as a follower. In particular, as a follower, the operation amplifier 36 drives the voltage level at the control node to equal the voltage level of the clamp signal plus the input offset, which establishes a control voltage level corresponding to the maximum allowable output current. Thus, during an over-current condition, the output current is regulated to a substantially constant level that is below the maximum rated output current level of the power regulation circuit 10 (FIG. 1).

The transistor 33 and the current source 34 are appropriately sized so that when an over-current condition occurs, the voltage level of the control signal will exceed the voltage level of the clamp signal. For example, during an over-current condition, the amplifier 12 (FIG. 1) will tend to increase the level of the control signal at the control node 16 in an attempt to further increase the output current. Thus, by appropriately selecting the sizes of the transistor 33 and the current source 34, the voltage level of the clamp signal can be set to equal the voltage level of the control signal corresponding to the maximum allowable output current. In view of this disclosure, those skilled in the art will be able to use simulation and design tools to determine the appropriate voltage level of the clamp signal and the sizes of the transistor 33 and current source 34 suitable to achieve this desired voltage level of the clamp signal.

When the over-current condition no longer exists, amplifier 12 (FIG. 1) will eventually reduce the level of the control signal to below the voltage level of the clamp signal (since the operational amplifier 36 has an open drain output stage and cannot operate to raise the voltage level at its output terminal). Thus, at this point, the operational amplifier will no longer influence the control signal at the control node 16.

One additional advantage of this embodiment is that the transistor 33 is connected to the power line 15 (which provides the power source output). This feature allows the voltage level of the clamp signal track the level of the power source output at power line 15, thereby reducing sensitivity to changes in the power source level. In addition, this feature allows the over-current protection circuit to properly operate when the pass element 11 (FIG. 1) is operating in the subthreshold region and linear or triode region, in addition to the saturation region. More particularly, the pass element 11 typically enters the linear or triode region when the voltage level at the power line 15 decreases so that the drain-to-source voltage of the pass element 11 is less than the difference between the gate-to-source voltage and the threshold voltage of the pass element 11. For example, this may occur when the device incorporating the power regulation circuit 10 enters a power saving mode. Because the transistor 33 is connected to the power line 15 (rather than the VDDA line 18), the transistor 33 will tend to enter the saturation region, the subthreshold region, and the linear or triode region at about the same time as the pass element 11. As a result, the voltage level of the clamp signal will change, tracking the change in the voltage level of the power line 15. Thus, the over-current protection circuit 13 continues to operate even when the pass element 11 is operating in the linear or triode region.

In a further refinement, the operational amplifier 36 is designed with an input offset to allow the operational amplifier 36 to stop driving the level of the control node 16 following removal of an over-current condition. For example, in one embodiment, the operational amplifier 36 is implemented using a PMOS input source-coupled pair, with the PMOS transistor connected to the negative terminal being four times the size of the PMOS transistor connected to the positive terminal.

In another embodiment, the operational amplifier 36 may be implemented using a standard output stage, but connected to drive the gate of another transistor that is connected to the control node 16 as an open-drain pull down device. The operational amplifier 36 controls the conductivity of this pull down transistor when the level of the control signal exceeds the level of the clamp signal to maintain the voltage level at the control node 16 to equal the voltage level of the clamp signal.

In yet another refinement, the operational amplifier 31 is implemented using an input pair designed to operate with an input common mode response that is below ground. This allows the operational amplifier to continue to function in closed loop operation when the voltage at the output terminal 14 (FIG. 1) falls to ground potential (e.g., when the output terminal 14 is shorted to ground). As a result, when the short is removed, the over-current protection circuit 13 will be able to operate and allow the power regulation circuit 10 to provide a regulated output.

Figure 4:
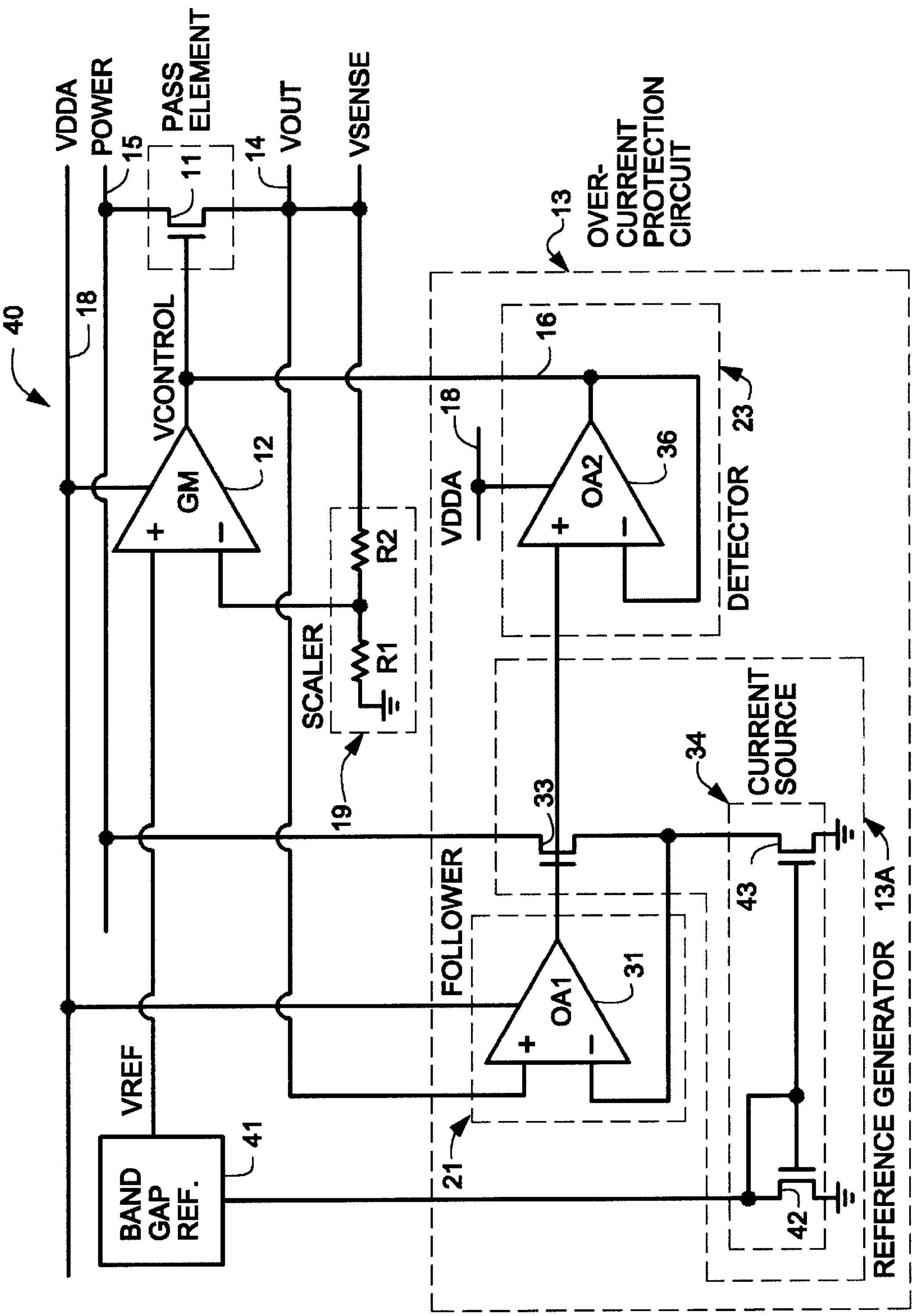
FIG. 4 illustrates a circuit diagram of a low-drop out voltage regulator with an over-current protection circuit, in accordance with one embodiment of the present invention.

FIG. 4 illustrates a low-drop out voltage regulator 40 using the over-current protection circuit 13 (FIG. 3), in accordance with one embodiment of the present invention. In this embodiment, voltage regulator 40 is similar to power regulator circuit 10 (FIG. 1), with the addition of a band gap reference 41 for generating reference voltages and bias currents. In addition, as indicated in by dashed lines in FIG. 4, the output terminal 14 can be electrically connected to the scaler 19 (i.e., the divider formed by the resistors R1 and R2) through a buffer, or off-chip, the voltage being indicated as VSENSE. In addition, in this embodiment, the amplifier 12 is implemented with a two-stage operational transconductance amplifier having a PMOS input pair. Further, the over-current protection circuit 13 is implemented as described above in conjunction with FIG. 3, with the current source 34 being implemented with a current mirror formed by a pair of transistors 42 and 43. The bias current used by the current mirror is generated by the band gap reference 41. Still further, in this embodiment, the scaler 19 is implemented using a voltage divider formed by series-connected resistors R1 and R2. The voltage reference provided by the band gap reference 41 corresponds to the divided down output voltage provided by the scaler 19 when the output voltage is at the desired regulated voltage level. The resistors R1 and R2 typically have high resistance values in comparison to the expected load to reduce power dissipation by the scaler 19. Although resistors R1 and R2 can have values over a large range, in one embodiment, the resistors R1 and R2 have a value of about 50KΩ and 53.5KΩ, respectively.

In a further refinement, the current conducted by the current mirror from the transistor 33 may be programmable using one or more transistors (not shown), connected in parallel with the transistor 43, that can be selectively enabled. In one embodiment, the parallel transistors can be mask programmable. In another embodiment, a non-volatile memory (not shown) can be programmed to selectively enable composite transistors that are connected in parallel with the transistor 43. In this embodiment, each composite transistor is formed with a pair of series-connected transistors, one transistor having its gate connected to the gate of the transistor 42 and the other having its gate connected to the non-volatile memory. The combined channel region of each composite transistor is connected in parallel with the channel region of the transistor 43. In this way, the level of the clamp signal may be adjusted to select the level of the over-current threshold of the voltage regulator 40.

Figure 5:
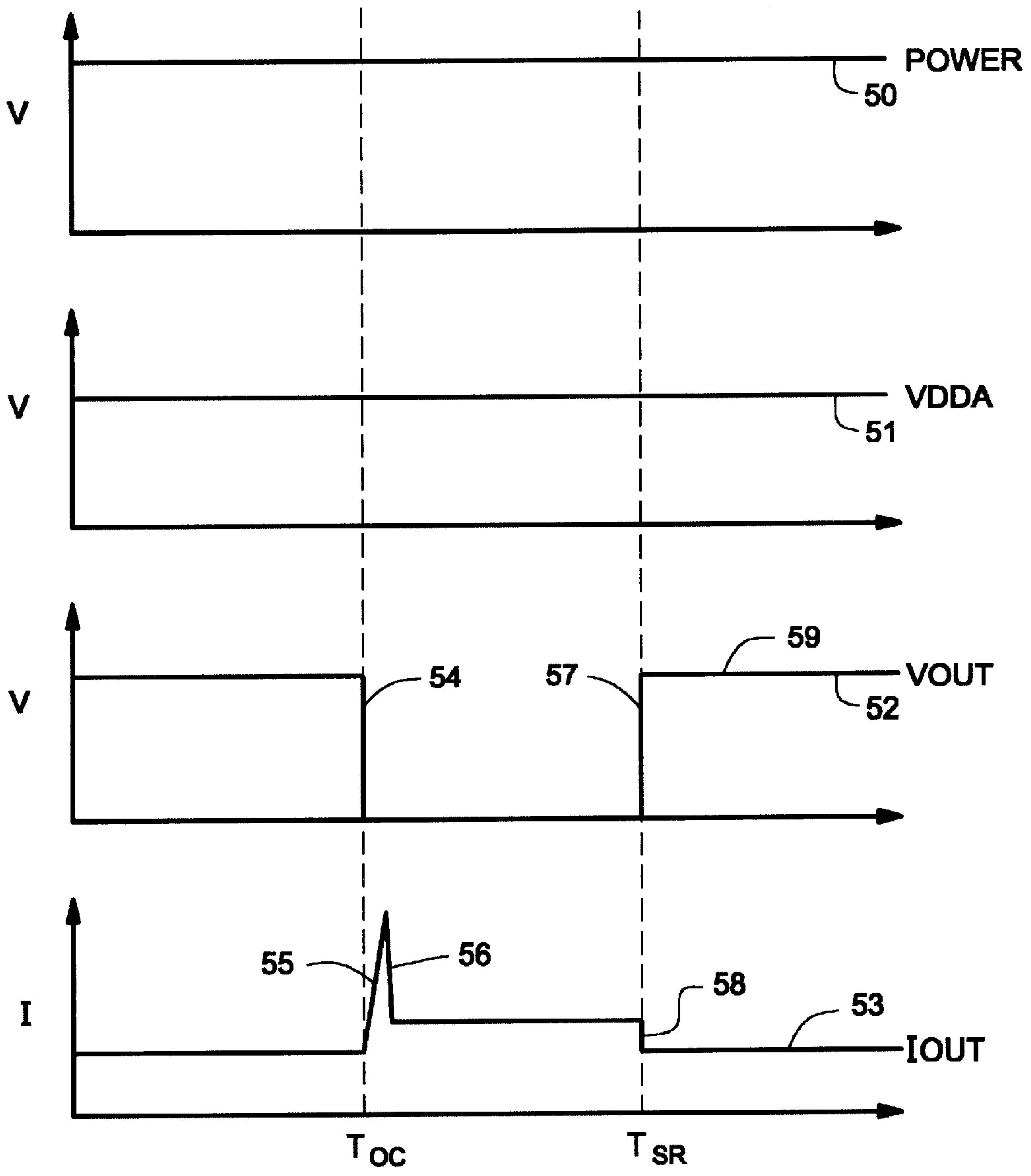
FIG. 5 illustrates a waveform diagram of the operation of the LDO voltage regulator of FIG. 4 during an over-current condition.

FIG. 5 illustrates a waveform diagram of the operation of the voltage regulator 40 (FIG. 4) during an over-current condition. Referring to FIGS. 4 and 5, the voltage regulator 40 operates as follows. The voltage level of the power source output at power line 15 and the VDDA control power output at line 18 are represented by waveforms 50 and 51, respectively. The output voltage level and output current level at output terminal 14 are represented waveforms 52 and 53.

In this illustration, an over-current condition begins at a time $T_{OC}$ when the output terminal 14 is shorted to ground. As a result, the output voltage level drops from its regulated level to near zero and the output current level spikes upwards, as indicated by arrows 54 and 55, respectively. However, as previously described, when this over-current conditions occurs, amplifier 12 causes the voltage level at the control node 16 to increase above the level of clamp voltage provided by the operational amplifier 31 and the transistor 33 of the over-current protection circuit 13. When this occurs, the operational amplifier 36 with its open-drain output stage drives the voltage level at the control node 16 down to the voltage level of the clamp signal, as indicated by the arrow 56. During the over-current condition, the output voltage level remains near zero volts, while the output current level remains relatively constant at a level lower than the maximum allowable output current.

The short is removed at a time $T_{SR}$, which allows the output voltage level to increase to its regulated level, as indicated by the arrow 57. Removing the short also reduces the output current, as indicated by arrow 58. Because the amplifier 36 has an open-drain output stage, the reduction in output current allows the amplifier 12 to take closed loop control of the voltage level at the control node 16 to regulate the output voltage at output terminal 14 as previously described.

Figure 6:
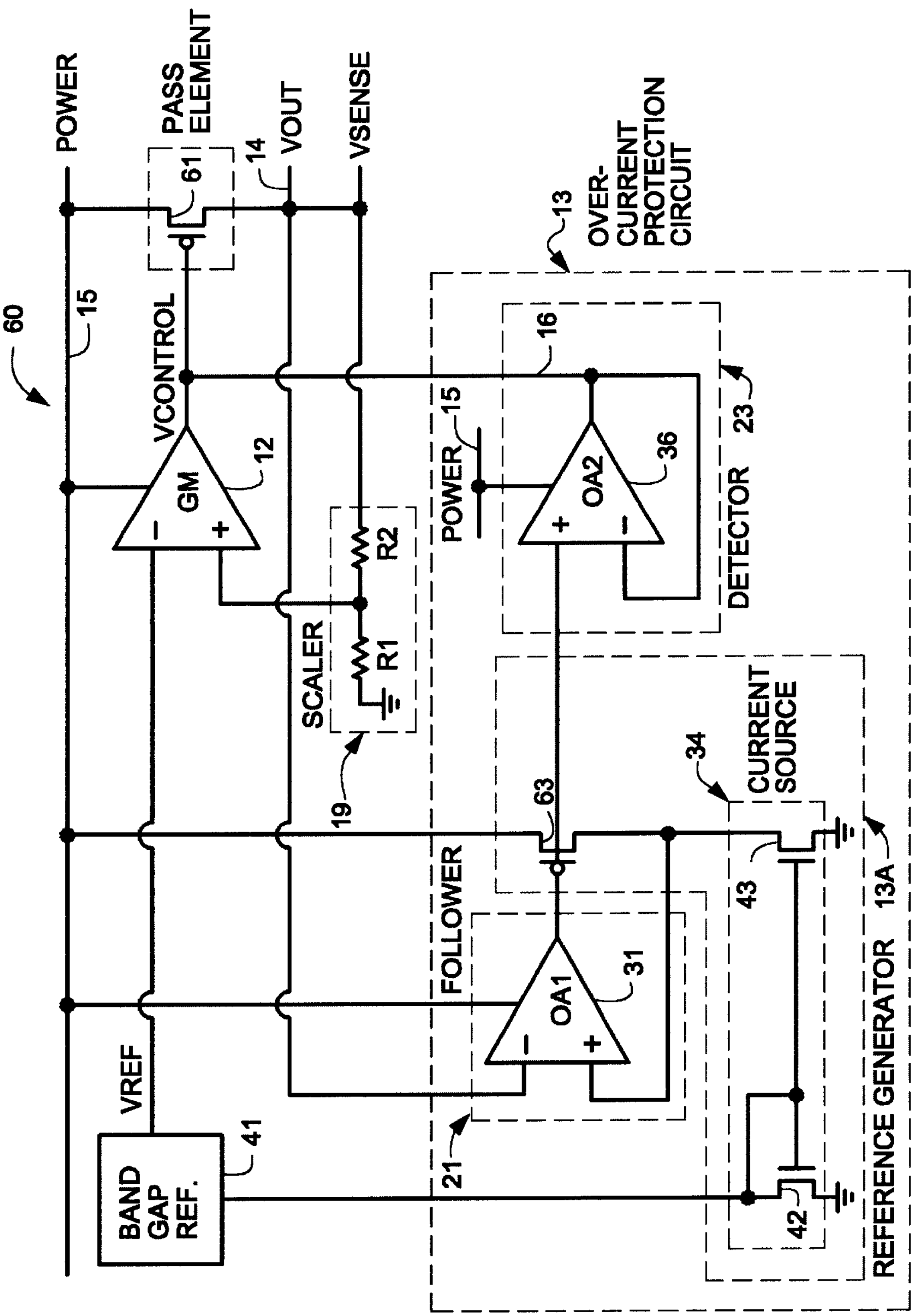
FIG. 6 illustrates a circuit diagram of a PMOS implementation of an over-current protection circuit, in accordance with one embodiment of the present invention.

FIG. 6 illustrates an over-current protection circuit 60 using a P-channel pass element 61, according to another embodiment of the present invention. This embodiment is substantially identical to the embodiment of FIG. 4, except that in addition to the PMOS pass element 61, the N-channel transistor 33 (FIG. 4) is replaced with a P-channel transistor 63, the lines 15 and 18 are common, and the input polarities of the amplifiers 12 and 31 are reversed. Otherwise, the over-current protection circuit 60 operates in essentially the same manner as described above for the over-current protection circuit 40 (FIG. 4), with the operational amplifier 36 having an open-drain P-channel device that operates to pull-up the level of the voltage at control node 16 when an over-current condition occurs.

The above specification, examples and data provide a complete description of the manufacture and use of the composition of the invention. In light of the present disclosure, many embodiments of the invention can be made without departing from the spirit and scope of the invention by those skilled in the art of power regulation circuits. For example, although an LDO voltage regulator application is described, other embodiments can be adapted for use in other power regulation applications by those skilled in the art without undue experimentation. Further, other embodiments may be implemented in fabrication technologies other than the CMOS technology described (e.g., bipolar, bi-CMOS, etc.). Accordingly, the invention is not to be limited to those embodiments disclosed, but rather, the invention resides in the claims hereinafter appended.

I claim:

1. An over-current protection circuit for use in a power regulation circuit, the power regulation circuit having a first pass element coupled to receive a control signal, the over-current protection circuit comprising:

a follower coupled to an output lead of the power regulation circuit;

a reference generator coupled to the follower and to a power line, wherein the reference generator comprises a second pass element having a control terminal that is coupled to a reference signal, a second terminal that is coupled to the power line, and a third terminal that is coupled to a current source and wherein the reference generator is configured to cause a reference signal having a level that is dependent on a level of the power source output present on the power line and on a level of an output signal present at the output lead of the power regulation circuit; and a detector coupled to the reference generator, wherein the detector is configured to change a level of the control signal when the level of the control signal reaches a predetermined value relative to the level of the reference signal.

2. The circuit of claim 1 wherein the follower comprises a first operational amplifier.

3. The circuit of claim 1 wherein the reference generator comprises a second pass element having a conductivity type that is the same as that of the first pass element.

4. The circuit of claim 1 wherein the reference generator further comprises a constant current source.

5. The circuit of claim 4 wherein the constant current source is programmable.

6. The circuit of claim 2 wherein the detector comprises a second operational amplifier.

7. The circuit of claim 6 wherein the second operational amplifier includes an open-drain output stage.

8. The circuit of claim 6 wherein the second operational amplifier has a preselected input offset.

9. A power regulation circuit, comprising:

a first pass element coupled to an output lead of a voltage regulator and to a power line carrying a power source output, the first pass element having a control terminal;

a reference voltage generator circuit configured to provide a reference voltage;

an operational transconductance amplifier having a first input lead, a second input lead and an output lead, the first lead being coupled to an output lead of the voltage regulator, the second input lead being coupled to receive the reference voltage, and the output lead coupled to the control terminal of the first pass element; and an over-current protection circuit coupled to the control terminal of the first pass element and to the output lead of the voltage regulator, wherein the over-current protection circuit includes a reference generator wherein the reference generator comprises a second pass element having a control terminal that is coupled to a reference signal, a second terminal that is coupled to the power line, and a third terminal that is coupled to a current source, and wherein the reference generator is configured to cause a reference signal to have a level that is dependent on a level of the power source output present on the power line and on a level of an output signal present at the output lead of the voltage regulator, and wherein the over-current protection circuit adjusts the level of the control signal in response to the level of the reference signal when an over-current condition occurs.

10. The circuit of claim 9 wherein the over-current protection circuit further comprises:

a follower coupled to the output lead of the voltage regulator; and a detector having a first input that is coupled to the reference generator and a second input and an output that are coupled to the control signal, wherein the detector is configured to change the level of the control signal when a level of the control signal reaches a predetermined value relative to the level of the reference signal.

11. The circuit of claim 10 wherein the follower comprises a first operational amplifier.

12. The circuit of claim 10 wherein the second pass element has the same conductivity type as the first pass element.

13. The circuit of claim 10 wherein the current source is a constant current source.

14. The circuit of claim 11 wherein the detector comprises a second operational amplifier.

15. The circuit of claim 14 wherein the second operational amplifier includes an open-drain output stage.

16. The circuit of claim 14 wherein the second operational amplifier has a preselected input offset.

17. An over-current protection circuit for use in a power regulation circuit, the power regulation circuit having a first pass element with a control node, an output lead and a power node, the control node coupled to receive a control signal dependent on a level of an output signal of the power regulation circuit, the power node coupled to a power line carrying a power source output, the over-current protection circuit comprising:

follower means for generating a signal that follows a signal provided at an output lead of the power regulation circuit;

reference means, coupled to the follower means and to a power line configured to provide a power source output, for generating a reference signal having a level that is dependent on a level of the power source output present on the power line and on a level of an output signal present at the output lead of the power regulation circuit; and detector means coupled to the reference means, for changing a level of the control signal when the level of the control signal reaches a predetermined value relative to the level of the reference signal.

18. The circuit of claim 17 wherein the reference means comprises a constant current source and a second pass element that has a conductivity type that is the same as that of the first pass element.

19. The circuit of claim 17 wherein the detector means comprises a second operational amplifier with an open-drain output stage.

20. The circuit of claim 19 wherein the second operational amplifier has a preselected input offset.

21. A method for providing over-current protection in a power regulation circuit, the power regulation circuit having a first pass element with a control node, an output lead and a power node, the control node coupled to receive a control signal dependent on a level of an output signal of the power regulation circuit, the power node coupled to a power line carrying a power source output, the method comprising:

receiving the output signal;

receiving the power source output;

generating a reference signal having a level that is dependent on a level of the power source output and on a level of the output signal; and changing a level of the control signal when the level of the control signal reaches a predetermined value relative to the level of the reference signal.

22. A circuit for providing over-current protection in a power regulation circuit, the power regulation circuit having a first pass element with a control node, an output lead and a power node, the control node coupled to receive a control signal dependent on a level of an output signal of the power regulation circuit, the power node coupled to a power line carrying a power source output, the circuit comprising:

means for receiving the output signal;

means for receiving the power source output;

means for generating a reference signal having a level that is dependent on a level of the power source output and on a level of the output signal; and means for changing a level of the control signal when the level of the control signal reaches a predetermined value relative to the level of the reference signal.

23. A method for providing over-current protection for a voltage regulator, the method comprising:

coupling power from a power line to an output node of the voltage regulator in response to a control signal such that a voltage associated with the output node varies in response to the control signal;

generating a clamp signal in response to the output node voltage and a feedback voltage associated with the power line such that the level of the clamp signal varies in response to fluctuations in the power line;

comparing a level associated with the clamp signal to a level associated with the control signal, whereby a determination of the existence of an over-current condition is made; and altering the control signal level when an over-current condition exists such that a current associated with the output node is reduced.

24. The method of claim 23, wherein the control signal level is reduced when an over-current condition exists.

25. The method of claim 23, wherein the control signal level is increased when an over-current condition exists.

26. The method of claim 23, further comprising changing the level of the control signal in response to the output node voltage and a reference voltage.

27. The method of claim 23, wherein the feedback voltage is servoed to the output node voltage.

28. The method of claim 23, wherein power from the power line is coupled to the output node by a device that operates in the sub-threshold and linear regions of the device.

29. The method of claim 23, wherein power from the power line is coupled to the output node by a circuit that operates in the linear and saturation regions of the device.

* * * * *